United States Patent
Brooks

(10) Patent No.: US 6,755,748 B2
(45) Date of Patent: Jun. 29, 2004

(54) SCREW HEAD FORMATION

(75) Inventor: Lawrence Antony Brooks, Sheffield (GB)

(73) Assignee: Uni-Screw Limited, Clifford ( * ) Notice: Subject to any disclaimer, the term of this patent is extended or adjusted under 35 U.S.C. 154(b) by 2 days.

(21) Appl. No.: 10/177,613

(22) Filed: Jun. 20, 2002

(65) Prior Publication Data

US 2003/0053887 A1 Mar. 20, 2003

(30) Foreign Application Priority Data

Sep. 17, 2001 (GB) .............................................. 0122244
Oct. 8, 2001 (GB) .............................................. 0124122

(51) Int. Cl.[7] .............................................. B21J 13/02
(52) U.S. Cl. ........................ 470/205; 76/107.1; 470/63
(58) Field of Search ......................... 470/63, 183, 205; 409/192, 199, 200, 201, 202, 203, 211, 213; 82/131; 72/462, 4; 11/476, 107.1

(56) References Cited

U.S. PATENT DOCUMENTS

| 3,080,776 | A | * | 3/1963 | Muenchinger | ............... 72/372 |
| 3,463,209 | A | | 8/1969 | Podolsky | |
| 3,640,175 | A | * | 2/1972 | Barclay | ...................... 411/403 |
| 3,728,892 | A | * | 4/1973 | Sangster | ...................... 72/476 |
| 4,704,824 | A | * | 11/1987 | Horner | ........................ 451/48 |
| 5,868,051 | A | * | 2/1999 | Pakos | ........................... 82/110 |
| 5,887,498 | A | * | 3/1999 | Miyamoto et al. | ........... 82/1.11 |
| 6,178,852 | B1 | * | 1/2001 | Pfaff | ........................ 76/107.1 |
| 6,234,914 | B1 | * | 5/2001 | Stacy | .......................... 470/63 |
| 6,506,004 | B1 | * | 1/2003 | Kohlhase et al. | ........... 409/131 |

FOREIGN PATENT DOCUMENTS

| GB | 1150382 | 4/1969 |
| GB | 2 285 940 A | 8/1995 |
| GB | 2 329 947 A | 4/1999 |
| WO | WO 01/77538 A1 | 10/2001 |

* cited by examiner

Primary Examiner—Ed Tolan
(74) Attorney, Agent, or Firm—Fish & Richardson P.C.

(57) ABSTRACT

The screw has two or three non-circular super-imposed recesses. The depth of each recess is less than 1.2 mm and there is a less than 1° of draw in each recess. The screw head recess is formed using a punch (10) in a cold-heading process. The punch is formed in a profilating CNC machine, cutting the profiles (12,14,16) of the punch to a tolerance of better than ±0.025 mm. A method of manufacture of a cold-forming punch for such a screw comprises providing a profilating head as one of the tools on a turret mounted adjacent the chuck in the CNC machine. The profilating head has several cutting elements, each being adjustable with respect to one another: axially, radially and angularly.

15 Claims, 6 Drawing Sheets

SCREW HEAD FORMATION

BACKGROUND OF THE INVENTION

The present invention relates to a form of screw head for a screw fastener, and to a tool to drive such screw. In particular, the invention relates to a method of manufacture of a punch for cold forming such screw head.

GB1150382 appears to be the first patent to recognise the benefits of a multi-tiered screw head design that has stepped tiers between a deep central recess and a wider top recess, the recess having sides parallel a central axis of the screw. Such recesses are effective at reducing "cam out". Furthermore, the recess can be deeper in the head of the screw without weakening the connection between the shaft of the screw and its head. This is because, at its deepest, where the countersink is narrowest or the transition between head and screw shank occurs, the recess is smallest.

GB2285940 elaborated on this principle and pointed out that the same screwdriver could be employed to drive large screws (having several tiers of recesses in their heads) as well as small screws having fewer or even just one tier of recess in their heads. Thus the proliferation of tools can be avoided as just one driver will fit, completely appropriately, a number of differently sized screws.

GB2329947 discloses a similar arrangement and discusses the method of manufacture of screws incorporating multi-tiered heads.

Such manufacture employs "cold heading". A punch, being the mirror of the recess desired, is driven into the unformed head of the screw. Momentarily, the metal is fluidised and flows around the shape of the punch.

Where machine screws are being constructed, it is common to provide them with a single tiered polygon recess. Allen, Roberts and Torx (registered trade marks) are all variations of this. In common, however, they have a deep recess which is constructed to tolerances of the order of ±0.25 mm. This degree of precision is adequate because the area of torque transmission (given the depth of the recess) is always sufficient to avoid rounding-out).

However, such a deep recess can neither be formed without substantial draw (to permit release of the punch after forming of the recess), nor can it be formed in a single strike. The draw does not result in significant cam-out problem because of the depth of the recess. But the multiple strike using progressively larger punches does result in greatly increased costs. On top of that the head must be relatively large to provide the necessary depth. As a result of this, the three types of polygonal recess mentioned above are not employed, at least not to a known significant extent, in countersunk wood screws.

In this market, cost is vitally important. Only various cross-heads or slotted-heads are common in counter-sunk wood screws. However, this is not only because of the cost associated with the other polygon recesses. Such constant cross section recesses cannot be deep in a coned (countersunk) wood-screw head. Moreover, heavy torque transmission capabilities provided by polygon-recessed screws are not normally necessary.

Despite the apparent advantages of the multi-tiered screw-head design, however, they have not yet succeeded in penetrating the market. The reason for this is simply that hitherto it has not been possible to put the idea into practical, that is to say, commercial, effect.

In order to construct multi-tier-recess, countersunk wood-screws at a cost that is competitive with existing cross-head screws, such as Posi-Driv (registered trade mark), certain criteria must be met:

1) the screw heads must be capable of being formed with a single strike of a punch. Otherwise process times and punch costs (for example, if two different punches are required) render the operation prohibitively expensive;
2) punches must have a strike capacity in excess of 100,000, or thereabouts, for the same reason; and
3) punches must be inexpensive to manufacture.

The present invention resides in two observations, based on problems experienced. One of these problems is that, with parallel sided recesses; punches tend to break because of the elastic grabbing of the tip of the punch (which tip forms the deepest, smallest recess) as the punch is withdrawn. This problem can be cured partly by making the recesses very shallow.

Secondly, by increasing the tolerance (that is, by making the screws to more precise dimensions), far from this increasing the cost as would be expected, in fact, it makes the achievement of the above criteria, or at least the first two of them, possible.

SUMMARY OF THE INVENTION

Accordingly, it is an object of a first aspect of, the present invention to provide a screw of the multi-tiered recess type which is capable of manufacture in a cost effective manner.

In accordance with this first aspect, there is provided a screw having in its head at least two noncircular superimposed recesses, a smaller one thereof in the base of a larger one thereof, wherein: the depth of each recess is less than 1.35 mm, preferably less than 1.2 mm; there is a less than 1° of draw in each recess; and where the tolerance in the cross-sectional dimensions of at least one recess is better than ±0.025 mm.

These parameters are not independent of one another but are a precisely calculated combination:

1) with such a shallow depth of recess a draw of less than 10 is possible without grabbing of the punch by elastic recovery of the material. In fact, substantially no draw is preferred.
2) with such a shallow depth of recess the recess can be formed by a single strike of the punch which renders the screw relatively inexpensive to manufacture. Moreover, the punch is likely to last for in excess of 100,000 strikes, which likewise leads to cost reduction. Further, although not as a result of this aspect of the invention, the punch can be made relatively inexpensively by a method described further below and this also impacts the cost of manufacture of the screw.
3) with such accurate tolerance and low draw the tendency of the driver to cam-out or round-out of the recess is reduced, even with such a shallow recess.
4) with such a shallow recess, and the other cost factors mentioned above, the head can economically be formed on counter-sunk wood screws so that the benefits first envisaged by GB1150382, and more recently in GB2285940, can at least be realised.

Incidentally, a parameter not mentioned above but of significant importance is the hardness of the material employed. The present parameters are designed for the material from which wood screws are commonly made. However, the same principles would apply to softer or harder materials, because the depth of recess that could be formed with a, single strike is of course larger with softer material (or less, with harder material). But the corollary of this is that a deeper recess is required with softer material, whereas a shallower recess will give equal security where the material is harder. Therefore the depth of 1.2 mm specified herein has to be read in the context of the material being employed, and will be less with harder than the material common in wood screws, or more in softer materials.

In any event, however, unless the punch is capable of being made to the tolerance specified and, moreover, at a cost that meets the third criterion mentioned above, the first aspect of the present invention is to no avail.

Accordingly, it is an object of a second aspect of the present invention to provide a method of manufacture of a punch which satisfies the foregoing objective.

In accordance with this second aspect, there is provided a method of manufacture of a cold-forming punch for screw heads intended to have a multi-tiered recess, each recess being a straight-sided polygon whose sides are substantially parallel the axis of the recess, said method comprising the step of adapting a computer numerical controlled machining centre having a bar feed to a rotary chuck by providing a profilating head as one of the tools on a turret mounted adjacent the chuck and capable of both axial and radial movement with respect to the axis of the chuck, as well as rotation about its own axis, said profilating head comprising at least two cutting elements arranged on the head, the cutting elements being adjustable with respect to one another: axially, with respect to the head axis; radially, with respect to said axis; and angularly with respect to said axis, whereby the cutting elements can be arranged to rotate around the same circle and with the requisite angular separation that at least some of the sides of a polygon are formed on the end of the bar when the cutter is rotated in the same direction, with respect to the bar, as the bar is rotated in the chuck, and the turret is moved axially and/or radially with respect to the chuck to bring the cutter into contact with an end face of the bar.

Preferably, there are as many cutting elements as there are sides to be cut of the polygon.

Preferably there are at least two sets of axially and radially offset cutting elements on the cutter adapted to cut different tiers of the punch at the same time. Said cutting elements may be of the same number in each set and may be angularly offset with respect to one another.

Preferably said turret has tools to slot the punch and to pare a formed punch from the feedstock bar, whereby the entire cutting steps in the formation of the punch may be completed on a single machine.

Preferably, there are at least two profilating heads on the turret each to cut different tiers of the punch. Indeed, one head may have a different number of cutting elements to the other so that a different polygon is formed on one tier compared to that formed by the other head.

After one tier is cut, the profilating head may be indexed angularly with respect to the chuck so that the second tier is offset angularly with respect to the first.

Preferably, at least each cutting element after a first one thereof is fixed in a cartridge that is angularly adjustably retained in a radial slot in an end face of the head, the cutting element being radially and axially adjustably secured in the cartridge.

Preferably the head is provided with radial datum faces on said slots provided at the requisite angle with respect to the first cutting element, shims being employed between the cartridge and said datum face to adjust the angular position of subsequently inserted cutting elements with respect to the first cutting element to be in place.

Preferably the cutting element is secured to the base of a recess in the cartridge by a fixing screw arranged parallel the axis of rotation of the head and passing through an oversize aperture through the cutting element.

Preferably, a grub screw is threaded in the cutting element radially offset from said fixing screw and abutting the base of said recess to provide axial adjustment of subsequent cutting elements with respect to the first.

Preferably, a wedge is disposed between a radially inner face of the cutting element and an inner end of the recess in the cartridge, an adjusting screw through the wedge and received in the base of the recess pulling the wedge into engagement between said inner face of the cutting element and said inner end of the recess to provide radial adjustment of subsequent cutting elements with respect to the first.

Preferably the first cutting element is the same as said subsequent cutting elements.

Preferably said angular adjustment is performed first, with said axial and radial adjustments being performed second in an iterative process until all the cutting elements rotate about the same circle as said head rotates in the turret.

By virtue of the three degrees of freedom of each cutting element it takes considerable skill and patience to adjust the cutting elements to reach the desired precision of position. The desired precision is in the order of ±2.5 microns in each direction. However, once the system is set up, it is simply a matter of turning the CNC machine on and letting it run. Once set-up, operation and production of punches can be automatic.

Profilating is a known art. However employing it to the precision anticipated by the present invention has not been contemplated hitherto. Precision of the order called for by the present invention would conventionally have been achieved by, for example, milling and grinding operations. However, using such processes immediately introduces expense and complication in relation to bodies of the shape required by punches according to the present invention. Moreover, to provide a fillet between tiers which serves to support each tier and reduce the tendency for tips of punches to snap-off, is not straightforward with milling and grinding operations. Thus the second aspect of the present invention enables the first aspect to be put into effect in a cost-effective manner.

In a third aspect, the present invention provides a screw having in its head at least two non-circular, super-imposed recesses, a smaller one thereof in the base of a larger one thereof, wherein there is less than 10 of draw in each recess and wherein the edge between the recesses is chamfered. The chamfer is preferably a radius of not less than 0.05 mm, preferably about 0.1 mm.

This chamfer does not greatly reduce the area of the faces of the recess that transmit torque between a correspondingly shaped tool inserted into the recesses. But it does have a marked effect on the lifetime of a punch that forms the recesses by cold-heading. As a consequence, the recesses can be deeper than would otherwise be possible, so regaining any lost area by virtue of the chamfer.

BRIEF DESCRIPTION OF DRAWINGS

The invention is further described hereinafter, by way of example, with reference to the accompanying drawings, in which.

DETAILED DESCRIPTION OF THE PREFERRED EMBODIMENT

Figure 1A:
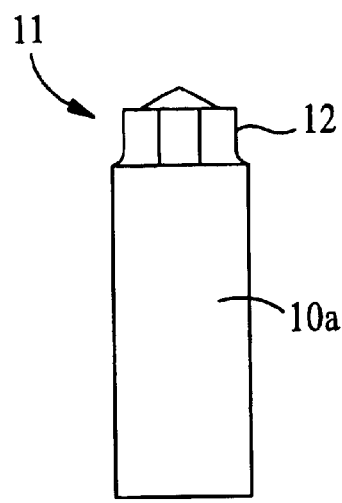
FIGS. 1a to d are side views of four punches to form in screw heads one-, two-, three- and four-tiered recesses respectively.
Figure 1B:
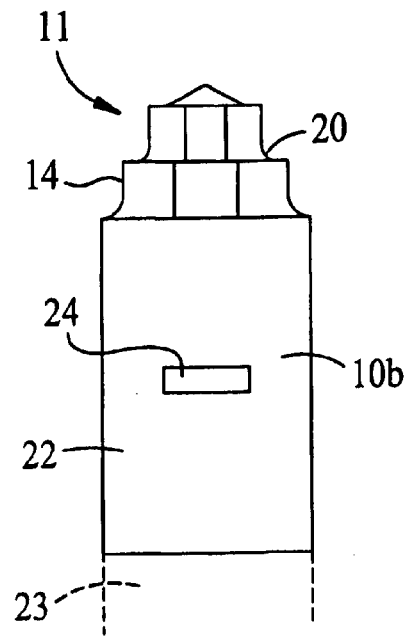
Figure 1C:
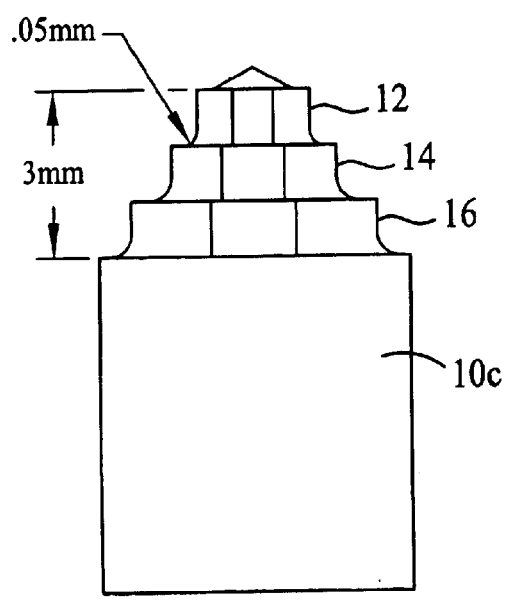
Figure 1D:
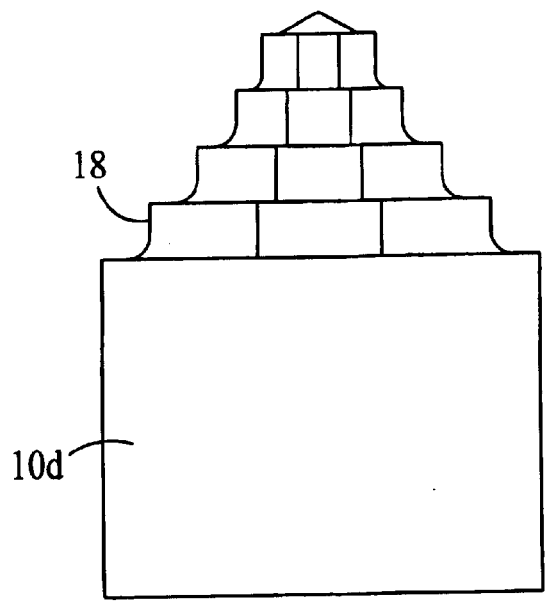

With reference to FIG. 1, each drawing illustrates a punch 10a,b,c,d having respectively one, two, three and four tiers 12,14,16,18. Each tier has a height of approximately 1 mm. Each tier has a fillet 20 at its base serving to support it. The fillet has a radius of approximately 0.05 mm. The punch 10 is made by cutting the profile of the head from a bar stock 22,23 using a profilating CNC machine described further below. As well as cutting the profile 11, the CNC machine will also cut a locating slot 24 and part the formed punch 10b from the remaining bar stock 23.

Figure 2:
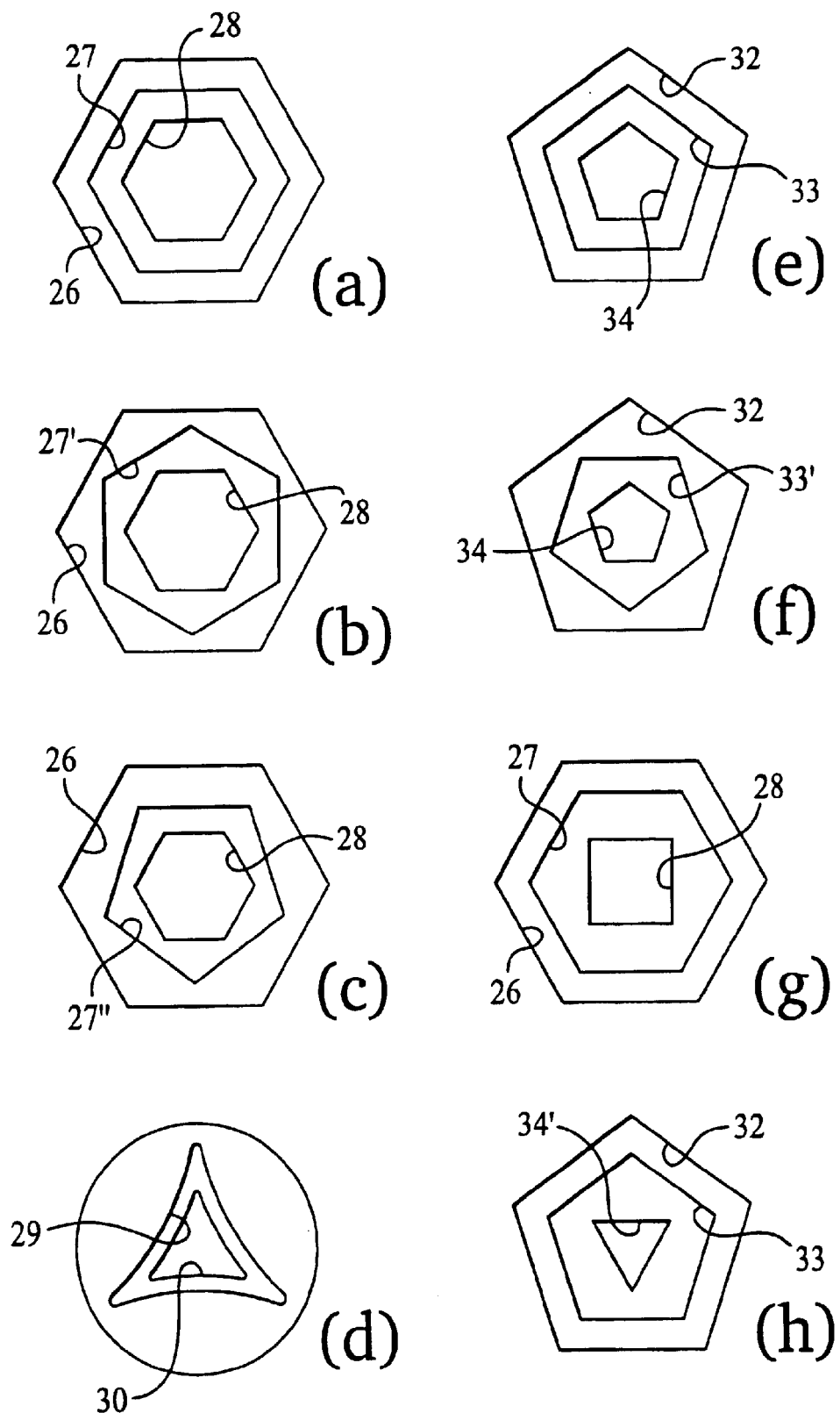
FIGS. 2a to h are feasible profiles of recesses in the heads of screws according to the present invention.

When the punch 10 is fitted in a cold heading device, and driven into the head of a screw in an axial direction, recesses having the profiles of the sort illustrated in FIG. 2 are formed.

FIG. 2a is a three-recess design with concentric and aligned hexagons 26,27,28. FIG. 2b is similar to FIG. 2a, except that the middle recess 27' is rotationally offset with respect to recesses 26,28 by 30°.

FIG. 2c is similar to FIG. 2b, except that middle recess 27" is a pentagon.

FIG. 2d is a double driving recess design in which the driving recesses 29,30 are triangular with concave sides.

FIG. 2e is similar to FIG. 2a, except employing pentagon recesses 32,33,34. FIG. 2f is as FIG. 2e except that the middle recess 33' is rotationally offset, by 36°. FIG. 2g is as FIG. 2a, except that inner recess 28' is square. Finally, FIG. 2h is as FIG. 2e; except that inner recess 34' is triangular.

Figure 3:
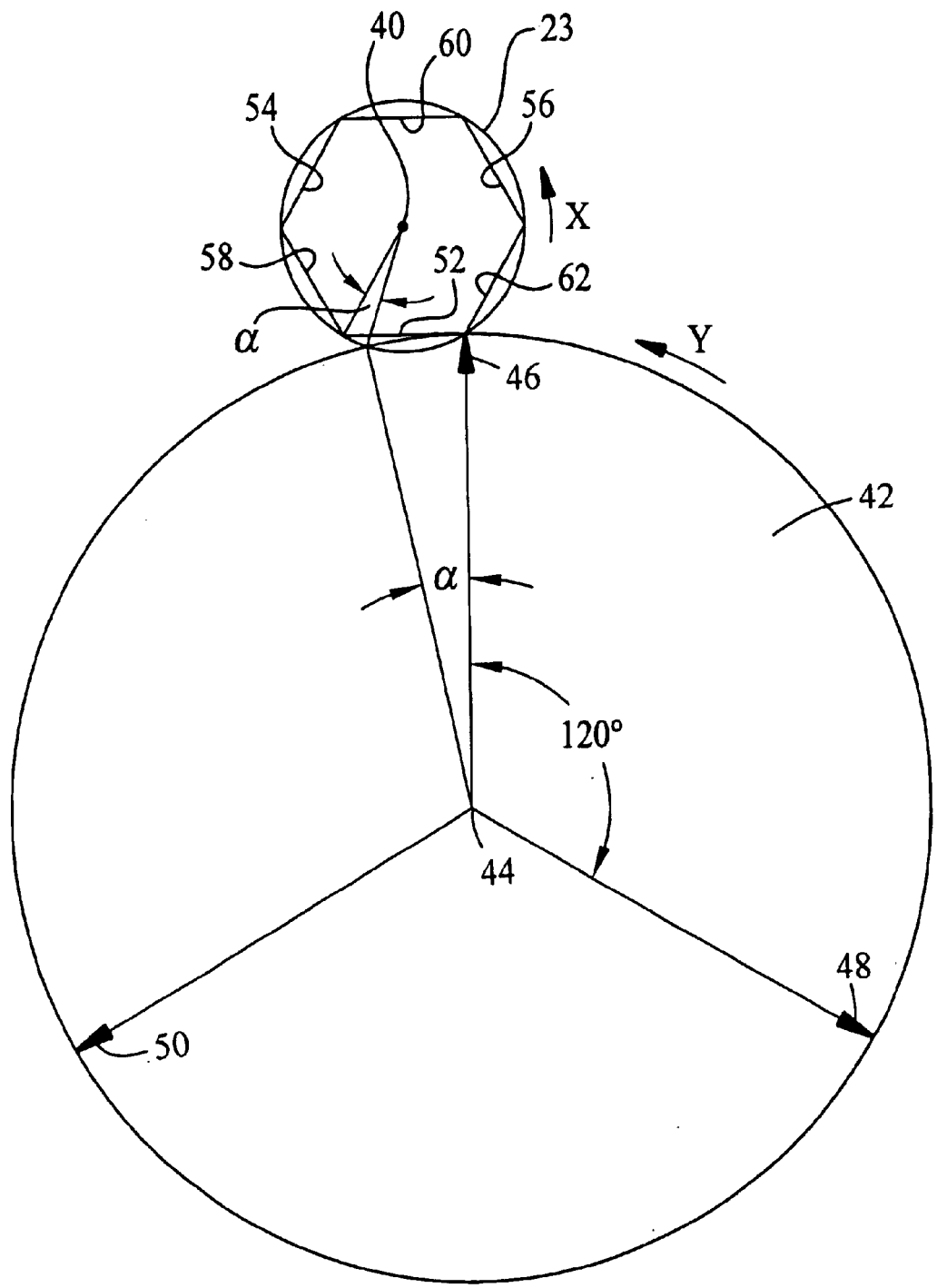
FIG. 3 is a diagram showing the basic geometry of the cutting process of the present invention.

Turning to FIG. 3, the profiles illustrated in FIG. 2 are first formed on a punch bar stock 23 in profilating CNC machine (not shown). The machine has a bar feed stock and chuck capable of rotating the bar feed stock 23 about an axis 40 in the direction of arrow X. Adjacent the chuck is a turret (not shown) capable of bringing a number of tools into position to work on the bar stock 23 held in the chuck of the machine. Suitable such CNC machines are made by, for example, Traub Drehmaschinen GmbH.

On the turret is mounted a profilating head 42 which is rotatable about an axis 44 which is parallel the axis 40. The profilating head is capable of being rotated at precisely the same speed as the chuck or at higher speeds. The profilator head rotates in the direction of the arrow Y in FIG. 3, that is, opposite the direction X of rotation of the bar stock 23. The head 42 is provided with a number of cutting tips 46,48,50. If the bar stock 23 and profilating head 42 are rotating at the same angular speed, then the cutting tip 46 will cut a perfect chord 52. Whether the chord 52 subtends an angle of 60° at the centre of the bar stock 23 depends on how close the axis 44 of the profilating head 42 is to the axis 40 of the bar stock 23.

As the bar stock 23 and profilating head 42 continue to rotate the cutting tip 48, if it is disposed 120° from tip 46 will contact the bar stock 23 120° after contact of the cutting tip 46. Tip 48 will then form chord 54. Likewise, cutting tip 50, a further 120° from cutting tip 48 will cut chord 56. Each chord does not need to be cut in one go, but could be cut by slow advancement of the axis 44 towards axis 40. Likewise, the whole depth of a tier does not need to be cut in one go, but two or more passes maybe made The profilating head 42 is moved axially with respect to the bar 23 after each complete pass in the cutting of chords 52, 54 and 56.

When those chords have been formed to the requisite axial depth, the angular indexing of bar 23 with respect to the profilating head 42 is adjusted by 60°. Then, when the process is repeated, chords 58,60,62 will be cut, thereby forming a hexagon profile on the bar 23.

Instead of forming the hexagon in two stages, it is quite possible to position three further cutting tips (not shown), evenly spaced between the cutting tips 46,48,50. Alternatively, if the speed of rotation of the profilating head 42 compared with the bar 23 is doubled, then instead of each cutter cutting a perfect chord (eg 52) each cutter will cut an arc in the bar 23 whose radius of curvature will be twice the radius of the profilating head 42. In FIG. 3, the relative dimensions of the bar stock 23 with respect to the profilating head 42 is exaggerated, and therefore the arc cut as just described is, to all intents and purposes, straight. However, in doubling the speed, the profilating head rotates 120° of rotation while the bar stock 23 only rotates 60°. Consequently, the entire hexagon is cut in one go (ie one revolution of the stock 23) (although gradual progression of the head towards the bar stock, is still necessary to cut the profile progressively).

Figure 4B:
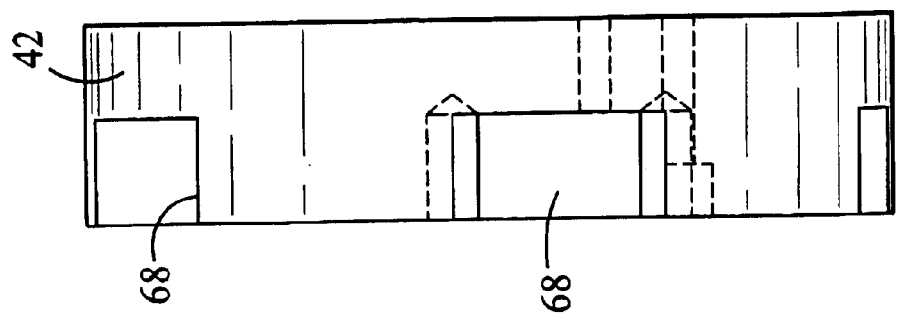
FIGS. 4a and b are a plan view and side view of a profilating head according to the present invention.
Figure 4A:
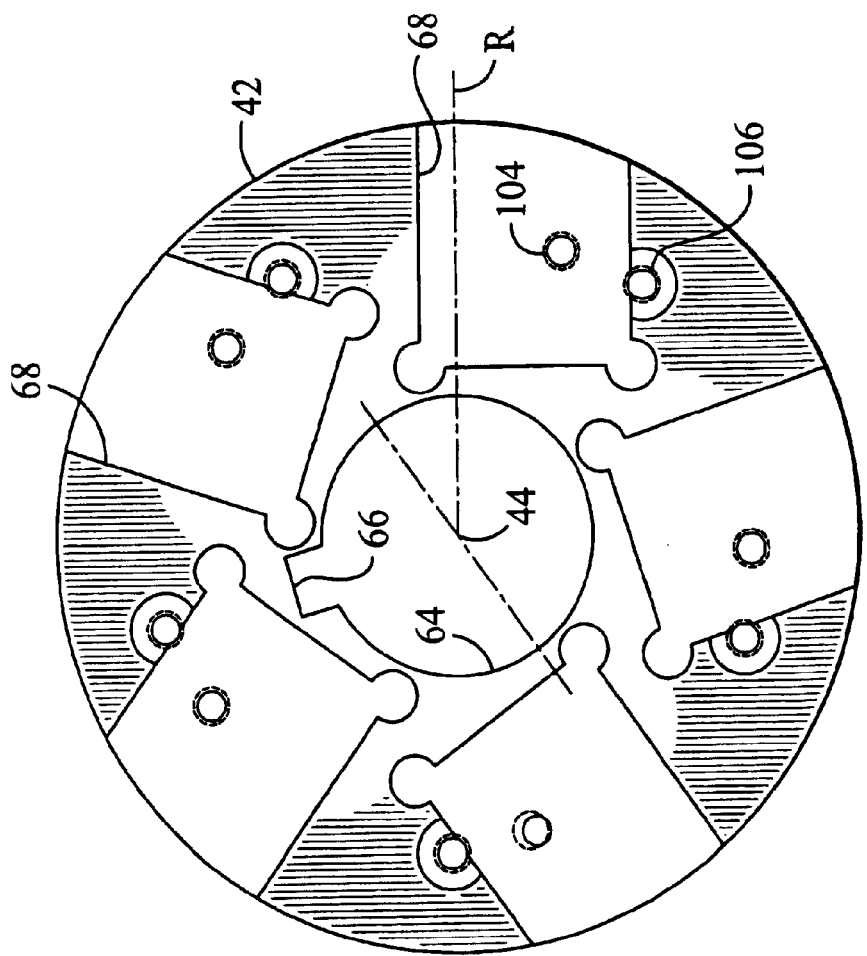

Turning to FIG. 4, profilating head 42 comprises a disc of material having a central bore 64 adapted to fit on the axle of the turret (neither shown). A key slot 66 permits the angular position of the profilating head to be determined. There are as many slots 68 formed in the profilator 42 as there are desired sides in the polygon being cut on the bar stock 23, in this case five.

Figure 5A:
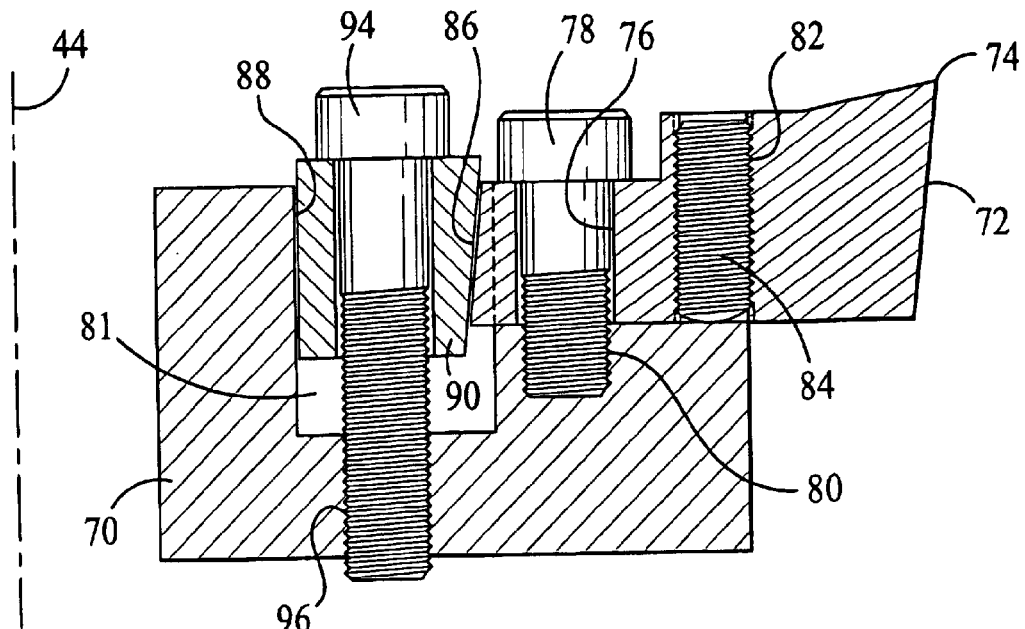
FIGS. 5a and 5b are respectively: a side section on the line A—A in FIG. 5b; and a plan view of part of the head shown in FIG. 4 with a cutter cartridge in place (screws removed)
Figure 5B:
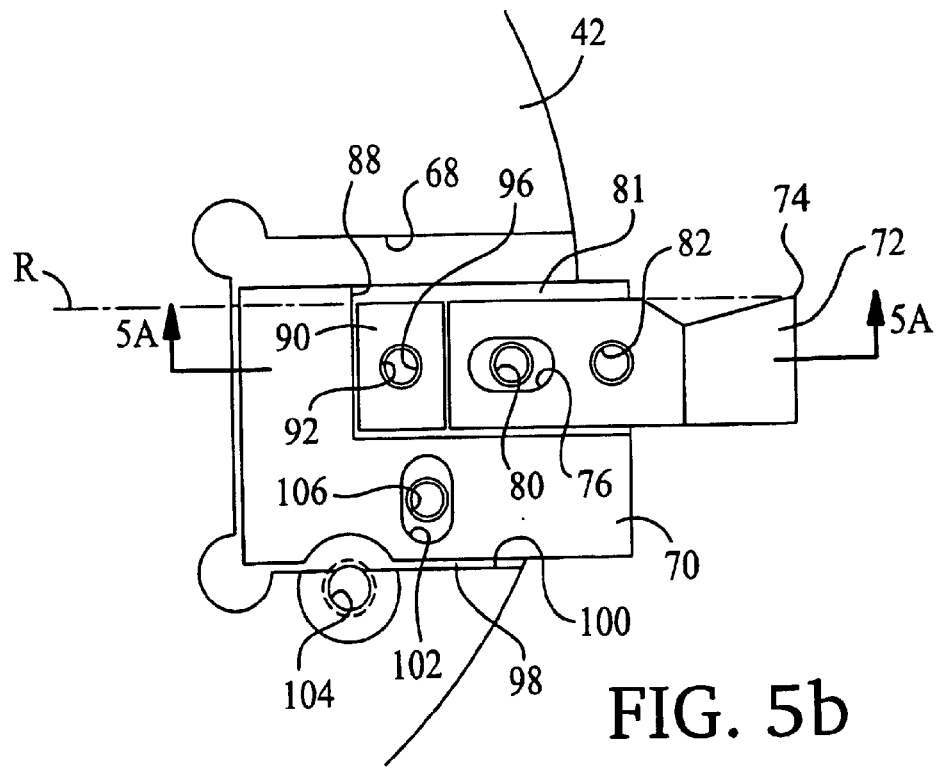

Each slot 68 is arranged to receive an adapted boring-bar cartridge 70 (see FIG. 5). Each cartridge 70 is arranged to mount a cutter element 72 having a cutting tip 74. The slot 68, cartridge 70, and cutting element 72 are so arranged that the cutting tip 72 lies close to or on the radius R of the profilating head 42. The cutting element 72 has an elongate aperture 76 through which a set screw 78 is adapted to pass and be secured in a threaded bore 80 in the cartridge 70. A threaded bore 82 is provided in the cutting element 72, which bore is radially off-set from the aperture 76. The bore 82 receives a grub screw 84 which is adapted to raise or lower the position of the cutting tip 74 with respect to the axis 44 of the profilating head 42.

Between an inner face 86 of the cutting element 72 and an end face 88 of a reception slot 81 of the cartridge 70, a wedge 90 is adapted to fit. The wedge 90 has a through bore 92 to receive a set screw 94 which is threaded in a bore 96 in the base of the slot 81.

Thus, when the set screw 78 is slackened, the screw 94 and wedge 90 can be adjusted to locate the cutting element 72 radially with respect to the axis 44. At the same time, the grub screw 84 can be employed to adjust the cutting element 72 axially with respect to the axis 44.

Finally, the position angularly with respect to the axis 44 of the cartridge 70 is itself adjustable. This is achieved by insertion of shims 98 between side 100 of the slot 68 and the side of the cartridge 70. To permit this, the cartridge 70 has an elongate aperture 102 (elongate in a circumferential direction with respect to the axis 44). The head 42 is also provided with two threaded bores 104, 106, each to receive a screw that secures the cartridge 70 firmly in place once the angular adjustment of the cartridge is effected.

Thus, the position of the cutting tip 74 with respect to each other cutting tip 74 on the profilating head 42 can be accurately set both axially and radially, as well as angularly. By this means, the precision with which the tiers 12,14,16 can be cut on a punch is such that accuracy to within ±0.0025 mm is possible. Furthermore, by cutting the tiers 12,14,16 in this adapted profilator, the formation of the fillets 20 is quite straightforward.

Furthermore, since the profilating head 42 is formed on the turret of the CNC machine, along with the other tools required to cut other formations on the punch 10 (for example the orientation slot 24), all cutting operations are effected on a single CNC machine as a single process. Thus, once the initial set-up of the profilating head is complete, the CNC machine can be left operating alone with only the occasional check of the tolerances of the produced punches.

Figure 6A:
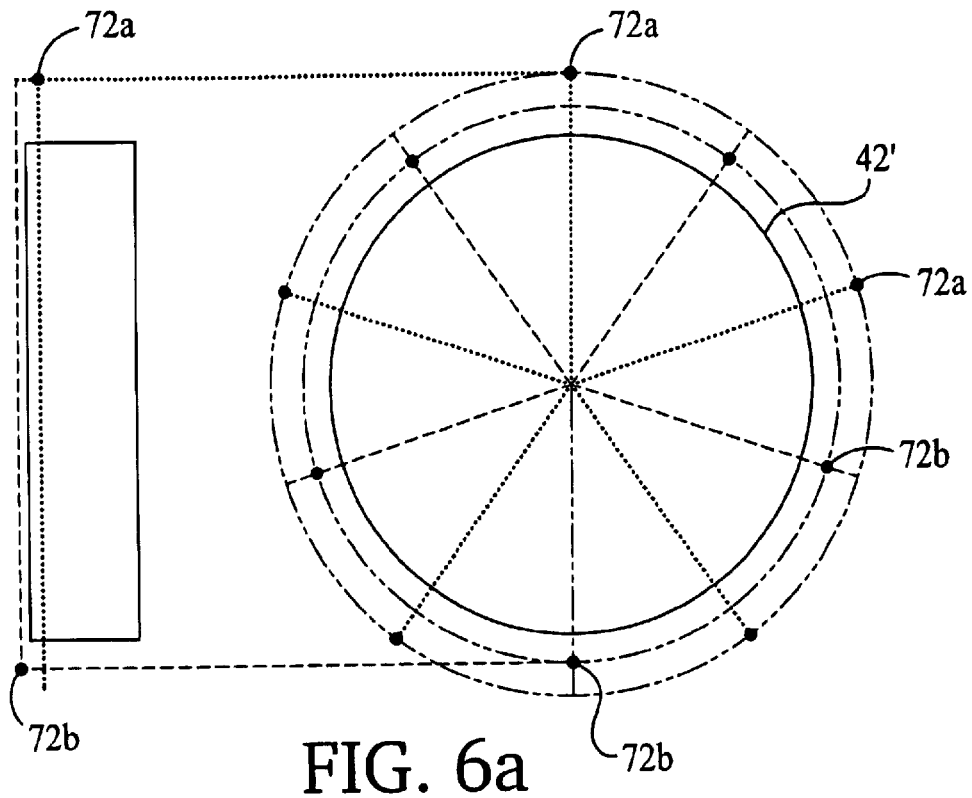
FIGS. 6a, b and c are respectively: a schematic illustration of a profilating head having two levels of cutters; a cutting procedure using such a profilating head; and a plan view of the recess so formed by a punch made with such head.

Finally, turning to FIG. 6a this shows a profilating head 42' having two sets of 5 cutting elements 72a and 72b. Cutters 72a are all on the same circle with respect to each other. However, this circle is displaced both axially and radially with respect to a circle on which all the cutters 72b are disposed.

Figure 6B:
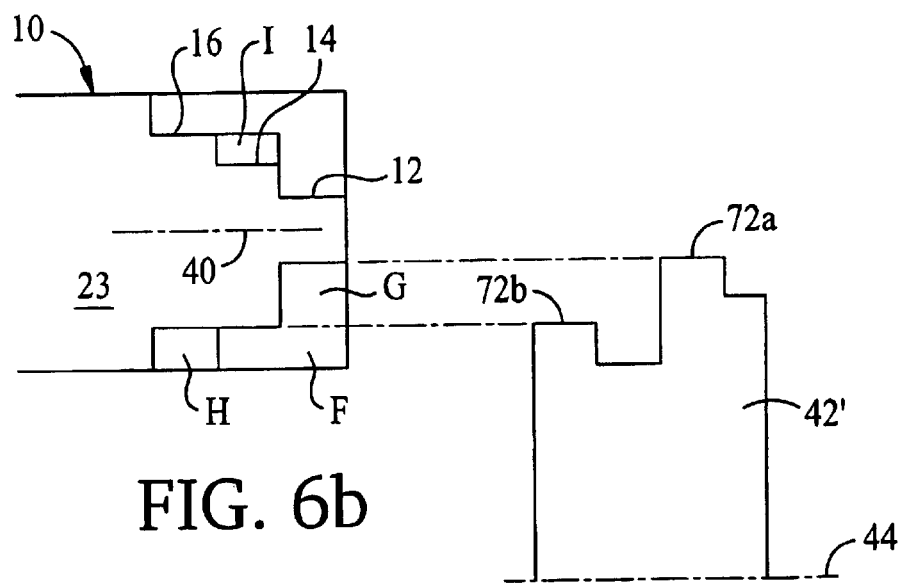

Referring to FIG. 6b, bar 23 is rotated about its axis 40 at the same speed as profilating head 42' is rotated about its axis 44. The profilator head 42' is advanced axially until the cutting elements 72b have machined away, and formed a pentagon profile on, the region F of the bar 23. At this point, cutter 72a also comes into effect. Region G of the bar 23 is then machined by it, while region H continues to be machined (extending from region F) by the cutting element 72b. Once the profiles F,G,H have been completed, the turret (not shown) of the CNC machine is rotated to move profilator 42' out of position. Instead, a further profilating head is brought into play to machine region I of the bar 23. Thus, tiers 12, 14, 16 of the punch 10 are formed. Using the tool indicated in FIG. 6a means that tiers 12 and 16 will both comprise pentagons, but each will, be off-set angularly with respect to the other by 36°. If the second profilating head has six, for example, cutting tools, and is rotated at the same speed as the bar stock 23, then tier 14 will comprise a hexagon.

Figure 6C:
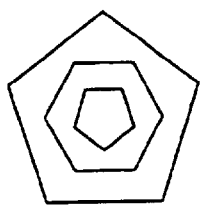

The profile will therefore be as shown in FIG. 6c. Such a profile gives a high degree of security when formed in a screw head. This is particularly so when the depth of the recesses are very shallow. In this event, a tool which engages just one of the recesses will not normally obtain sufficient purchase to rotate the screw when it has been previously tightened to its required torque. Instead, the tool will round out or cam out from the recess in which it is placed. It is only a tool that engages at least 2 of the recesses that will gain sufficient purchase in order to overcome the torque applied to the screw.

What is claimed is:

1. A method of manufacture of a cold-forming punch for screw heads intended to have a multi-tiered recess, each recess being a straight-sided polygon whose sides are substantially parallel the axis of the recess, said method comprising the step of adapting a computer numerical controlled machining centre having a bar feed to a rotary chuck by providing a profilating head as one of the tools on a turret mounted adjacent the chuck and capable of both axial and radial movement with respect to the axis of the chuck, as well as rotation about its own axis, said profilating head comprising at least two cutting elements arranged on the head, the cutting elements being adjustable with respect to one another: axially, with respect to the head axis; radially, with respect to said axis; and angularly with respect to said axis, whereby the cutting elements can be arranged to rotate around the same circle and with the requisite angular separation that at least some of the sides of a polygon are formed on the end of the bar when the cutter is rotated in the same direction, with respect to the bar, as the bar is rotated in the chuck, and the turret is moved axially and/or radially with respect to the chuck to bring the cutter into contact with an end face of the bar.

2. The method of claim 1, in which there are as many cutting elements as there are sides to be cut of the polygon.

3. The method of claim 1, in which there are at least two sets of axially and radially offset cutting elements on the cutter adapted to cut different tiers of the punch at the same time.

4. The method of claim 3, in which said cutting elements are of the same number in each set and are angularly offset with respect to one another.

5. The method of claim 1, in which said turret has tools to slot the punch and to pare a formed punch from the feedstock bar, whereby the entire cutting steps in the formation of the punch may be completed on a single machine.

6. The method of claim 1, in which there are at least two profilating heads on the turret each to cut different tiers of the punch.

7. The method of claim 6, in which one head has a different number of cutting elements to the other so that a different polygon is formed on one tier compared to that formed by the other head.

8. The method of claim 1, in which, after one tier is cut, the profilating head is indexed angularly with respect to the chuck so that the second tier is offset angularly with respect to the first.

9. The method of claim 1, in which at least each cutting element after a first one thereof is fixed in a cartridge that is angularly adjustably retained in a radial slot in an end face of the head, the cutting element being radially and axially adjustably secured in the cartridge.

10. The method of claim 9, in which the cutting element is secured to the base of a reception slot in the cartridge by a fixing screw arranged parallel the axis of rotation of the head and passing through an oversize aperture through the cutting element.

11. The method of claim 10, in which a grub screw is threaded in the cutting element radially offset from said fixing screw and abutting the base of said reception slot to provide axial adjustment of subsequent cutting elements with respect to the first.

12. The method of claim 10, in which a wedge is disposed between a radially inner face of the cutting element and an inner end of the reception slot in the cartridge, an adjusting screw through the wedge and received in the base of the reception slot pulling the wedge into engagement between said inner face of the cutting element and said inner end of the reception slot to provide radial adjustment of subsequent cutting elements with respect to the first.

13. The method of claim 9, in which the head is provided with radial datum faces on said slots provided at the requisite angle with respect to the first cutting element, shims being employed between the cartridge and said datum face to adjust the angular position of subsequently inserted cutting elements with respect to the first cutting element to be in place.

14. The method of claim 9, in which the first cutting element is the same as said subsequent cutting elements.

15. The method of claim 1, in which said angular adjustment is performed first, with said axial and radial adjustments being performed second in an iterative process until all the cutting elements rotate about the same circle as said head rotates in the turret.

* * * * *